United States Patent
Hashimoto et al.

(10) Patent No.: US 11,231,700 B2
(45) Date of Patent: Jan. 25, 2022

(54) COMMUNICATION SYSTEM, COMMUNICATION METHOD, AND INFORMATION STORAGE MEDIUM

(71) Applicant: Kabushiki Kaisha Yaskawa Denki, Kitakyushu (JP)

(72) Inventors: Ayaka Hashimoto, Kitakyushu (JP); Takeshi Nagata, Kitakyushu (JP); Hirotaka Niimi, Kitakyushu (JP); Toshinobu Kira, Kitakyushu (JP); Wataru Nozaki, Kitakyushu (JP); Masaomi Kudo, Kitakyushu (JP); Yu Katono, Kitakyushu (JP); Hiroshi Okamoto, Kitakyushu (JP); Takaaki Shogaki, Kitakyushu (JP); Megumi Yasuda, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 60 days.

(21) Appl. No.: 16/801,178

(22) Filed: Feb. 26, 2020

(65) Prior Publication Data
US 2020/0278662 A1  Sep. 3, 2020

(30) Foreign Application Priority Data
Feb. 28, 2019  (JP) .............................. JP2019-035773

(51) Int. Cl.
G05B 19/418  (2006.01)

(52) U.S. Cl.
CPC ..... G05B 19/4183 (2013.01); G05B 19/4186 (2013.01)

(58) Field of Classification Search
None
See application file for complete search history.

(56) References Cited

U.S. PATENT DOCUMENTS

2005/0157338 A1*  7/2005  Koike ............... H04N 1/00811
                                                          358/1.15

FOREIGN PATENT DOCUMENTS

| EP | 3073632 A1 | 9/2016 |
|----|------------|--------|
| EP | 3376326 A1 | 9/2018 |
| JP | 2007-114862 A | 5/2007 |
| JP | 2020067752 A | 4/2020 |

OTHER PUBLICATIONS

Office Action dated Oct. 20, 2020, for corresponding JP Patent Application No. 2019-035773 with partial English translation pp. 1-4.
Search Report dated Jul. 28, 2020, for corresponding EP Patent Application No. 20159506.3.

* cited by examiner

*Primary Examiner* — Carlos R Ortiz Rodriguez
(74) *Attorney, Agent, or Firm* — HEA Law PLLC

(57) ABSTRACT

A communication system comprising a first industrial machine and a second industrial machine, which are configured to communicate with each other, wherein the first industrial machine is configured to transmit a copy instruction to the second industrial machine, and wherein the second industrial machine is configured to: update data in a first storage area based on its own operation; copy the data in the first storage area to a second storage area when the copy instruction is received; and transmit the data in the second storage area to the first industrial machine.

20 Claims, 6 Drawing Sheets

COMMUNICATION SYSTEM, COMMUNICATION METHOD, AND INFORMATION STORAGE MEDIUM

CROSS-REFERENCE TO RELATED APPLICATION

The present disclosure contains subject matter related to that disclosed in Japanese Patent Application JP2019-035773 filed in the Japan Patent Office on Feb. 28, 2019 the entire contents of which are hereby incorporated by reference.

BACKGROUND OF THE INVENTION

1. Field of the Invention

The embodiments disclosed herein relate to a communication system, a communication method, and an information storage medium.

2. Description of the Related Art

In JP 2007-114862 A, it is described that, in a system in which a controller controls a servo drive, the servo drive is configured to store data on communication with the controller in trace data in time series, and to transmit the trace data to the controller at any timing.

SUMMARY OF THE INVENTION

According to one aspect of the present invention, there is provided a communication system including a first industrial machine and a second industrial machine, which are configured to communicate with each other, wherein the first industrial machine is configured to transmit a copy instruction to the second industrial machine, and wherein the second industrial machine is configured to: update data in a first storage area based on its own operation; copy the data in the first storage area to a second storage area when the copy instruction is received; and transmit the data in the second storage area to the first industrial machine.

DESCRIPTION OF THE EMBODIMENTS

[1. Overall Configuration of Communication System]

From a viewpoint of the inventor of the present invention, in a communication system in which a first industrial machine and a second industrial machine are configured to communicate with each other, the first industrial machine may acquire data indicating a state of the second industrial machine at a desired timing in order to execute breakdown prediction and breakdown diagnosis for the second industrial machine, for example. However, when a communication load is high at this timing, the second industrial machine is required to transmit the data in spite of the high communication load, and may thus further increase the communication load. As a result of extensive research and development for reducing the communication load at the time when the data on the industrial machine is acquired at a desired timing, the inventor of the present invention has conceived a novel and original communication system and the like. A detailed description is now given of the communication system and the like according to an embodiment of the present invention.

Figure 1:
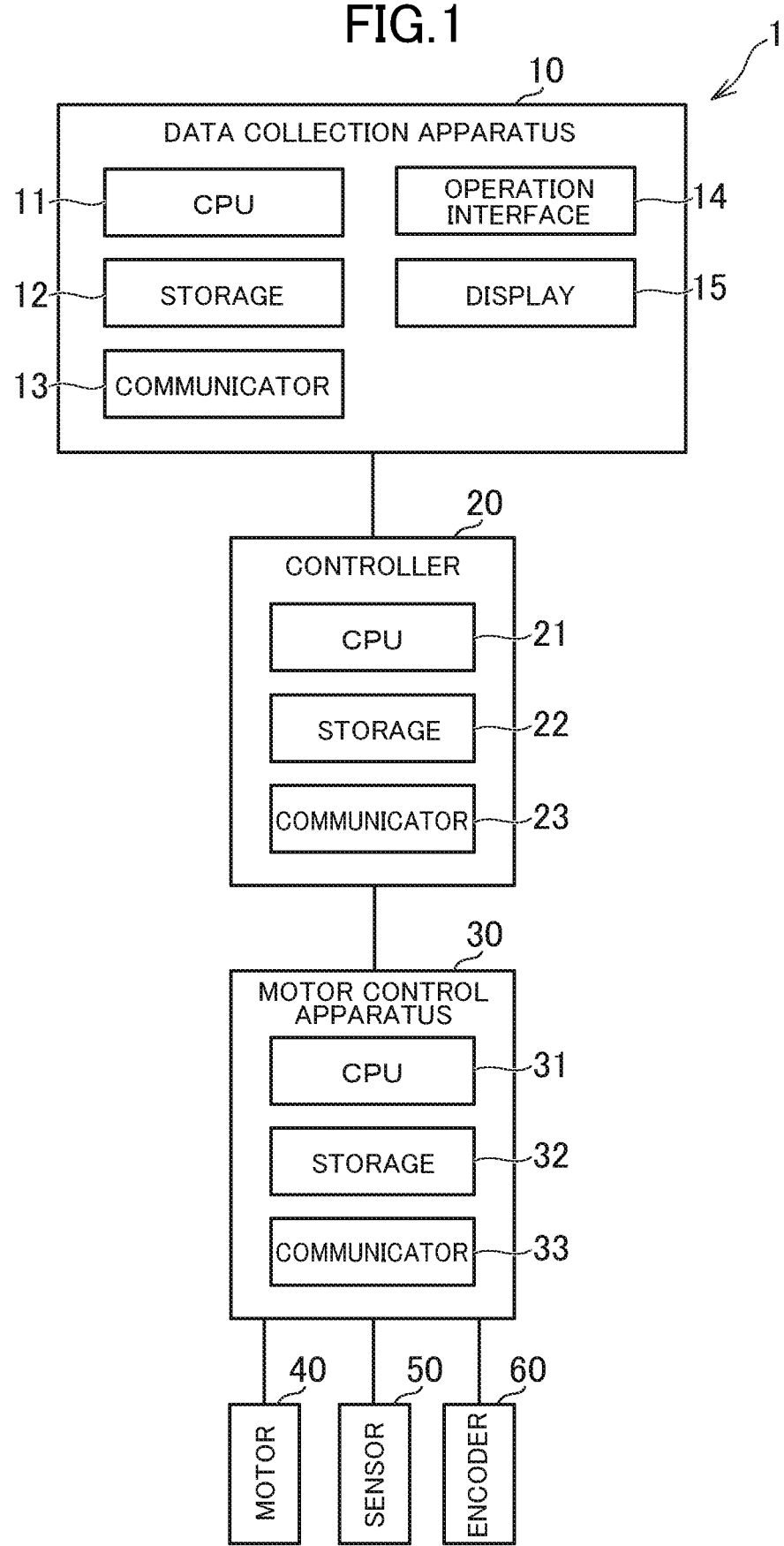
FIG. 1 is a diagram for illustrating an example of an overall configuration of a communication system according to an embodiment of the present invention.

FIG. 1 is a diagram for illustrating an example of an overall configuration of the communication system according to the embodiment. As illustrated in FIG. 1, the communication system 1 includes a data collection apparatus 10, a controller 20, a motor control apparatus 30, a motor 40, a sensor 50, and an encoder 60. In this configuration, one component is illustrated for each of those components for the sake of simple description, but the communication system 1 may include a plurality of components for each of the components. For example, a plurality of data collection apparatus 10 may be included in the communication system 1, or a plurality of controllers 20 may be connected to one data collection apparatus 10 as in a modification example of the present invention described later.

The data collection apparatus 10 is a computer configured to collect state data. The state data is data indicating a state of a machine. For example, the state data may be data indicating a state at a certain time point or in a certain period, or may be data indicating a state change in time series. The state of the machine is information indicating an operation of the machine, and may be a physical quantity detected by the sensor 50 or the encoder 60, and may be a state inside the controller 20 or the motor control apparatus 30. For example, the state of the machine is a torque signal, temperature information (for example, chip temperature, inside-air temperature, and motor temperature), a feedback speed, a motor position, a settling time, a position deviation, a speed deviation, a current deviation, a current load, an overshoot amount, a consumable remaining life, a residual vibration frequency, a CPU usage rate, a memory usage rate, or a communication load.

In this embodiment, the data collection apparatus 10 is an example of a third industrial machine. Therefore, a portion described as "data collection apparatus 10" in this embodiment can be replaced by "third industrial machine". The industrial machine is a general name of a machine configured to support or take over work to be executed by a human and a peripheral machine of this machine. For example, in addition to the data collection apparatus 10, the controller 20 and the motor control apparatus 30 described later also correspond to industrial machines. In addition, for example, a robot controller, an industrial robot, an inverter, a converter, a machine tool, or a PLC corresponds to the industrial machine.

For example, the data collection apparatus 10 is a server computer, a personal computer, a cellular phone (including a smartphone), or a mobile terminal (including a tablet terminal). The data collection apparatus 10 includes a CPU 11, a storage 12, a communicator 13, an operation interface 14, and a display 15.

The CPU 11 includes at least one processor. The storage 12 includes a RAM, an EEPROM, and a hard disk, and is configured to store various types of programs and data. The CPU 11 is configured to execute various types of processing based on those programs and data. The communicator 13 includes a network card and a communication interface, for example, various types of communication connectors, and is configured to communicate with other devices. The operation interface 14 is an input device such as a mouse and a keyboard. The display 15 is a liquid crystal display, an organic EL display, or the like, and is configured to display various types of screens in accordance with an instruction from the CPU 11.

The controller 20 is an apparatus configured to control the motor control apparatus 30. In this embodiment, a description is given of a case in which the controller 20 controls one motor control apparatus 30, but the controller 20 may control a plurality of motor control apparatus 30. Further, not only the motor control apparatus 30 but also sensors and input/output devices may be connected to the controller 20, for example.

For example, the controller 20 includes a CPU 21, a storage 22, and a communicator 23. The physical configuration of the CPU 21, the storage 22, and the communicator 23 is the same as that of the CPU 11, the storage 12, and the communicator 13. The controller 20 may include an integrated circuit for a specific application (ASIC), for example, motor control.

The motor control apparatus 30 is an apparatus configured to control the motor 40. The motor control apparatus 30 may also be referred to as "servo amplifier" or "servopack" (trademark). In this embodiment, a description is given of a case in which the motor control apparatus 30 controls one motor 40, but the motor control apparatus 30 may control a plurality of motors 40. Further, not only the motor 40, the sensor 50, and the encoder 60, but also input/output devices and the like may be connected to the motor control apparatus 30.

The controller 20 is an example of the first industrial machine. The motor control apparatus 30 is an example of the second industrial machine. Therefore, a portion described as "controller 20" can be replaced by "first industrial machine" in this embodiment. Moreover, a portion described as "motor control apparatus 30" can be replaced by "second industrial machine" in this embodiment.

The meaning of the "industrial machine" is as described above. The second industrial machine is a machine communicably connected to the first industrial machine. The first industrial machine is a machine for receiving state data on the state of the second industrial machine (a machine of a transmission destination of the state data). The second industrial machine is a machine for transmitting the state data (a machine of a transmission source of the state data). The second industrial machine may also be considered as a machine configured to generate the state data, or a machine whose operation is to be analyzed.

In this embodiment, a description is given of a case in which the first industrial machine is a master machine, and the second industrial machine is a slave machine, but the first industrial machine and the second industrial machine may not be in the master/slave relationship. In other words, the master/slave relationship or a hierarchical relationship may not exist between the first industrial machine and the second industrial machine.

The "master machine" is a machine configured to control the slave machine, and is a machine configured to transmit a command to the slave machine. In other words, the master machine is a machine configured to acquire an operation state from the slave machine. The "slave machine" is a machine configured to operate based on a command from the master machine, and is a machine to be controlled by the master machine. In other words, the slave machine is a machine configured to transmit the own operation state to the master machine.

In this embodiment, the motor control apparatus 30 operates based on the command from the controller 20. Thus, the controller 20 corresponds to the master machine, and the motor control apparatus 30 corresponds to the slave machine. When a plurality of controllers 20 are included in the communication system 1, and a master/slave relationship is provided among the controllers 20, a controller 20 serving as a master corresponds to the master machine, and a controller 20 serving as a slave corresponds to the slave machine.

For example, the motor control apparatus 30 includes a CPU 31, a storage 32, and a communicator 33. The physical configuration of the CPU 31, the storage 32, and the communicator 33 is the same as that of the CPU 11, the storage 12, and the communicator 13. The motor control apparatus 30 may include an integrated circuit for a specific application (ASIC), for example, motor control. The motor control apparatus 30 is configured to control a voltage directed to the motor 40 connected through power lines based on the command received from the controller 20. The motor 40 may be a motor of a rotary type or a linear type.

The sensor 50 is only required to be a sensor capable of detecting a physical quantity, and is, for example, a torque sensor, a temperature sensor, a force sensor, or a motion sensor. The encoder 60 is a machine configured to detect a position or a speed of the motor 40, and is, for example, an optical or magnetic motor encoder. The encoder 60 is also a type of sensor. The motor control apparatus 30 is configured to transmit a physical quantity detected by the sensor 50 and a feedback speed detected by the encoder 60 to the controller 20 at any timing.

Programs and data described as being stored in each of the data collection apparatus 10, the controllers 20, and the motor control apparatus 30 may be supplied through the network. Moreover, the hardware configurations of the data collection apparatus 10, the controllers 20, and the motor control apparatus 30 are not limited to the above-mentioned examples, and various types of hardware can be applied. For example, a reader (for example, optical disc drive or memory card slot) configured to read a computer-readable information storage medium and an input/output device (for example, USB terminal) configured to directly connect to an external device may be included. In this case, programs and data stored in the information storage medium may be supplied through the reader or the input/output device.

[2. Overview of Communication System]

In the communication system 1, the controller 20 and the motor control apparatus 30 communicate with each other. The controller 20 transmits the command to the motor control apparatus 30, and the motor control apparatus 30 controls the motor 40 based on the command. The controller 20 and the motor control apparatus 30 are connected to each other through so-called "field network", and communication is executed through use of any communication protocol. The communication system 1 according to this embodiment can use synchronous communication, and the controller 20 uses the synchronous communication so as to transmit the command to the motor control apparatus 30.

The "synchronous communication" is such a communication method that a timing at which a machine on a transmission side transmits data and a timing at which a machine on a reception side receives the data are synchronized. In the synchronous communication, other processing is not executed in principle in a period from transmission of a request of data communication to a reception of a response. Therefore, the machine on the transmission side transmits the data to the machine on the reception side, and then waits for the reception of the response. When the machine on the reception side receives the data from the machine on the transmission side, the machine on the reception side immediately executes processing so as to return a processing result as the response to the machine on the transmission side. When the machine on the transmission side receives the processing result, the machine on the transmission side transitions to next processing. When the synchronous communication is not executed, the communication is executed through use of asynchronous communication.

The "asynchronous communication" is such a communication method that the timing at which the machine on the transmission side transmits data and the timing at which the machine on the reception side receives the data are not synchronized. In the asynchronous communication, other processing can be executed in the period from the transmission of the request for the data communication to the reception of the response. Therefore, in the asynchronous communication, the machine on the transmission side can execute other processing in the period from the transmission of the data to the machine on the reception side to the reception of the response. Moreover, in the asynchronous communication, the machine on the reception side may not always execute the processing immediately after the reception of the data from the machine on the transmission side. The machine on the reception side postpones the execution of the processing until a predetermined condition is satisfied, or preferentially executes processing of the synchronous communication.

In this embodiment, a command transmitted through use of the synchronous communication is referred to as "synchronous task," and a command transmitted through use of the asynchronous communication is referred to as "asynchronous task." For example, when the controller 20 transmits a synchronous task to the motor control apparatus 30, the controller 20 waits without executing other processing until the response from the motor control apparatus 30 is received. When the motor control apparatus 30 receives the synchronous task from the controller 20, the motor control apparatus 30 immediately executes the synchronous task, and transmits a processing result to the controller 20.

Meanwhile, when the controller 20 transmits an asynchronous task to the motor control apparatus 30, the controller 20 can then execute other processing before the reception of the response from the motor control apparatus 30. For example, the controller 20 can transmit another asynchronous task or transmit a synchronous task until the response of the asynchronous task is received. When the motor control apparatus 30 receives the asynchronous task from the controller 20, the motor control apparatus 30 may not always execute the asynchronous task immediately.

For example, when a condition for executing the asynchronous task is set, the motor control apparatus 30 does not execute the asynchronous task until this condition is satisfied. In addition, for example, when a priority is assigned to each task, the motor control apparatus 30 preferentially executes other task higher in priority than the asynchronous task, and postpones the asynchronous task. When the motor control apparatus 30 executes the asynchronous task, the motor control apparatus 30 transmits a processing result to the controller 20.

The data collection apparatus 10 and the controller 20 may be able to execute synchronous communication as in the field network connecting the controller 20 and the motor control apparatus 30 to each other, or may not particularly use synchronous communication. A communication protocol for communication between the data collection apparatus 10 and the controller 20 and a communication protocol for communication between the controller 20 and the motor control apparatus 30 may be the same, or may be different from each other.

For example, the controller 20 uses the synchronous communication so as to transmit an operation command for the motor 40 as a synchronous task. The motor control apparatus 30 executes the operation command immediately after the reception of the operation command. In this embodiment, the storage 32 of the motor control apparatus 30 is divided into a plurality of storage areas. When the motor control apparatus 30 executes the operation command received from the controller 20, the motor control apparatus 30 generates state data, for example, the feedback speed described above, and stores the state data in a predetermined storage area. In this embodiment, this storage area is referred to as "first storage area".

The first storage area is a storage area in which the state data is to be stored. In other words, the first storage area can be considered as a storage area to be updated when the operation command is executed. The first storage area may be an area located at any memory address, and may be, for example, an area located at a single memory address or an area located across a plurality of memory addresses. Moreover, the memory size of the first storage area may be any size, and may be defined in accordance with a data size of the state data to be stored. For example, the user may be able to specify any address and size as the memory address and the memory size of the first storage area. The first storage area is hereinafter referred to as "original data area". Therefore, a portion described as "original data area" in this embodiment can be replaced by "first storage area".

In this embodiment, a description is given of a case in which a plurality of original data areas exist in the storage 22, but the number of original data areas may be only one. Moreover, a plurality of types of state data may be stored in one original data area, but one type of state data is stored in one original data area in this embodiment. Therefore, the type of state data and the original data area have a one-to-one relationship.

Figure 2:
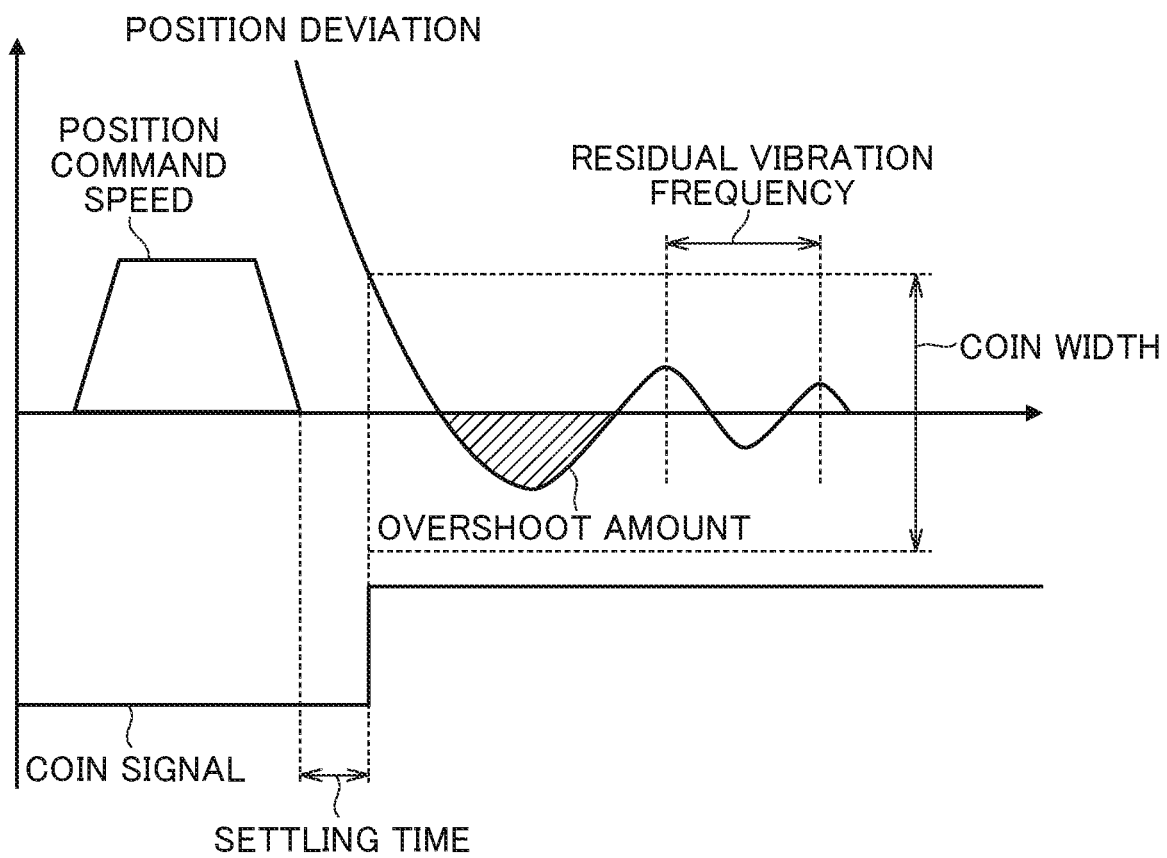
FIG. 2 is a graph for showing examples of state data stored in an original data area.

FIG. 2 is a graph for showing examples of the state data stored in the original data area. A description is given of state data for determining a position of the motor 40 (so-called "positioning system data") as an example. The horizontal axis of FIG. 2 is a time axis, and a positioning command speed is an operation command from the controller 20, and is a command relating to a position and speed of the motor 40. A COIN signal turns on when an operation indicated by the command is determined to be finished. In the example of FIG. 2, the position command speed represents a command to accelerate the motor 40 up to a constant speed from a stop state and then gradually decrease the speed so as to stop the motor 40. The COIN signal turns on when a position deviation detected by the encoder 60 falls below a threshold value and then the motor 40 stops.

As shown in FIG. 2, the settling time is a time difference to an actual operation of the motor 40 in response to the position command speed, and indicates, for example, a difference between a timing of a stop indicated by the position command speed and a timing at which the motor 40 actually stops. The settling time is also sometimes referred to as "positioning settling time". The overshoot amount is a movement component in a case in which the motor 40 goes back and forth while crossing a predetermined position when the motor 40 is stopped. The residual vibration frequency is a frequency of the position deviation in the case in which the motor 40 goes back and forth while crossing the predetermined position when the motor 40 is stopped. A COIN width is a width based on the position deviation at the time when the COIN signal turns on. The settling time, the overshoot amount, the residual vibration frequency, and the COIN width are examples of the state data.

For example, when the motor control apparatus 30 executes the operation command, the motor control apparatus 30 generates the state data as described above based on the signal detected from the sensor 50 or the encoder 60, and stores the state data in the original data area. The state data stored in the original data area is repeatedly updated based on the operation of the motor control apparatus 30. For example, when the motor control apparatus 30 is cyclically controlled, the state data is rewritten into the latest value each tome the control cycle arrives. Therefore, when the controller 20 acquires the state data on the motor control apparatus 30 at a desired timing for the purpose of the breakdown prediction and the breakdown diagnosis, the controller 20 is required to read out the state data stored in the original data area before the state data at the desired timing is updated.

If the controller 20 uses synchronous communication so as to transmit a readout request for the state data stored in the original data area, and causes the motor control apparatus 30 to execute the readout request as a synchronous task, the synchronous task is executed immediately, and hence the state data at the desired timing can be acquired.

However, the synchronous communication is often used for transmitting important data directly relating to the operation of the motor 40, and the synchronous communication may not be able to be used for the state data (there may be no capacity for the synchronous communication). For example, the state data is mainly used for the breakdown prediction and the breakdown diagnosis, and is thus low in urgency and importance compared with the operation command and the like, and may be acquired later without haste. Therefore, it is considered that the synchronous communication is preferably used for data higher in urgency and importance. Moreover, there is a technology capable of acquiring trace data at a desired timing, but the trace data has a relatively large data size, and hence it is considered that the necessity for using the technology of acquiring the trace data in order to acquire the state data at only one time point is low.

Meanwhile, when the controller 20 uses asynchronous communication so as to transmit the readout request, the motor control apparatus 30 executes the readout request as an asynchronous task. As described above, it is not known when the asynchronous task is executed. Thus, the state data stored in the original data area may be updated before the asynchronous task is executed, and the state data at the desired timing may not be able to be acquired.

In view of this, in this embodiment, a storage area for copying and holding the state data at the desired timing independently of the original data area is provided in the motor control apparatus 30. In this embodiment, this storage area is referred to as "second storage area".

The second storage area is a storage area to which the state data in the original data area is to be copied. In other words, the second storage area is a storage area being a destination of the copy of the state data in the original data area. The second storage area is not updated even when the operation command is executed, and content of data is thus held. The second storage area may be an area located at any memory address, and may be, for example, an area located at a single memory address or an area located across a plurality of memory addresses. Moreover, the memory size of the second storage area may be any size, and may be defined in accordance with a data size of the state data to be copied. For example, the user may be able to specify any address and size as the memory address and the memory size of the second storage area. The second storage area is hereinafter referred to as "data copy area". Therefore, a portion described as "data copy area" in this embodiment can be replaced by "second storage area".

In this embodiment, a description is given of a case in which a plurality of data copy areas exist in the storage 22, but the number of data copy areas may be only one. Moreover, in this embodiment, a description is given of a case in which a data copy area is provided for each original data area, and the original data area and the data copy area thus have a one-to-one relationship, but one data copy area may be shared by a plurality of original data areas. For example, respective pieces of state data in a plurality of original data areas may be copied at once to one data copy area, or the respective pieces of state data in the plurality of original data areas may alternately use the one data copy area. Conversely, the state data in one original data area may be loaded onto a plurality of data copy areas.

In this embodiment, the controller 20 uses synchronous communication to transmit not a readout instruction for the original data area, but a copy instruction for the original data area so that the copy instruction is executed as a synchronous task. The copy instruction is an instruction for copying the state data in the original data area to the data copy area. In other words, the copy instruction is an instruction for holding or securing the state data. The copy instruction may be executed through transmission of the data having a predetermined format, and contains an identifier for identifying the copy instruction. The copy instruction is an instruction for copying and holding the state data at a certain time point, and is thus sometimes referred to as "data latch trigger".

For example, the copy instruction contains information that enables identification of state data to be copied, and contains, for example, a memory address of the original data area serving as a copy source, a type or name of the state data, or a memory address of the data copy area serving as a copy destination. When the entire state data is forcedly data to be copied, and it is thus not required to individually identify the state data to be copied, those pieces of information may not be contained in the copy instruction.

The motor control apparatus 30 processes the copy instruction as a synchronous task, and copies the state data in the original data area to the data copy area. As a result, even when the state data in the original data area is updated, the state data before the update (that is, state data at the desired timing) remains being held in the data copy area. The state data copied to the data copy area is transmitted at a later suitable timing. The motor control apparatus 30 does not transmit the state data as a synchronous task, but only copies the state data, and hence an increase in communication load at this timing can be avoided. A description is now given of specific processing and functions of the communication system 1.

[3. Processing to be Executed in Communication System]

Figure 3:
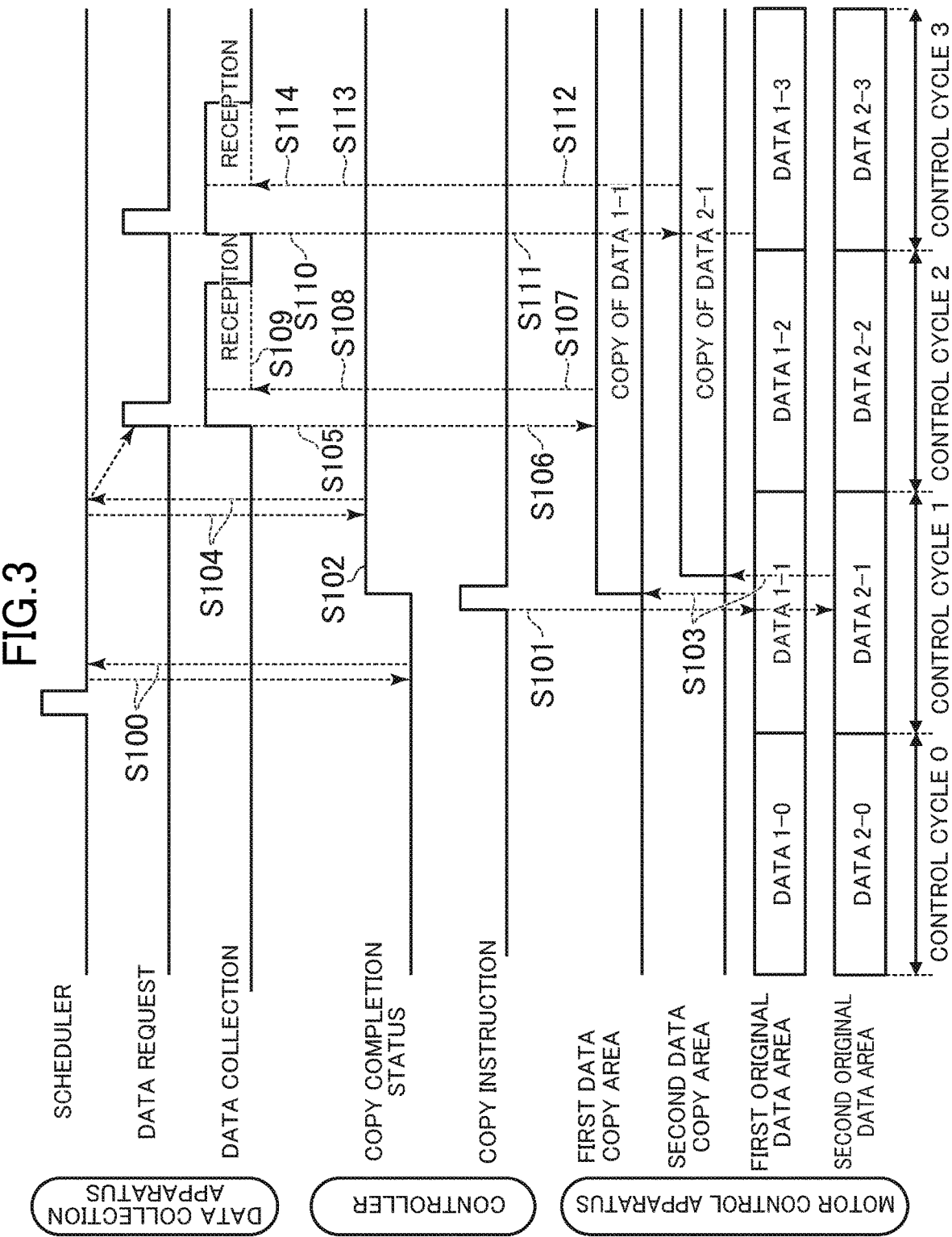
FIG. 3 is a diagram for illustrating processing to be executed in the communication system.

FIG. 3 is a diagram for illustrating processing to be executed in the communication system 1. The processing illustrated in FIG. 3 is executed by the CPUs 11, 21, and 31 operating in accordance with programs stored in the storages 12, 22, and 32, respectively. The processing described below is an example of processing to be executed by functional blocks illustrated in FIG. 4 described later. Moreover, in FIG. 3, an operation command for the motor 40 from the controller 20 to the motor control apparatus 30, a response thereto, and the like are omitted.

In FIG. 3, two original data areas and two data copy areas are illustrated, but three or more original data areas and data copy areas may exist. In this embodiment, the motor control apparatus 30 controls the motor 40 based on the operation command received from the controller 20 in each control cycle, to thereby update the state data stored in the original data area. In the example of FIG. 2, first state data stored in a first original data area is indicated by reference numeral "1-n", and second state data stored in a second original data area is indicated by reference numeral "2-n". A numerical value "n" is an integer of 0 or more, and is a numerical value for identifying the control cycle. As "n" increases, the control cycle indicated by "n" is later in time. As reference numerals "1-0" to "1-4" and "2-0" to "2-4" indicate, each of the first state data and the second state data is updated each time the control cycle arrives.

As illustrated in FIG. 3, the data collection apparatus 10 starts polling the controller 20 based on a scheduler (Step S100). The scheduler turns "on" when a time at which the polling is required to be started arrives. The timing at which the scheduler turns "on" can be specified by the user, and is stored in advance in the storage 12. In addition, for example, the scheduler may turn "on" at any timing, for example, at the time of generation of an alarm in the controller 20.

The polling is periodically executed, and a copy completion status stored in the storage 22 of the controller 20 is referred to. The "copy completion status" is information indicating whether or not the transmission of the copy instruction has been completed. In other words, the copy completion status is information indicating whether or not the copy from the original data area to the data copy area has been completed. The copy completion status is "not completed" as an initial value, and changes to "completed" when the copy instruction is transmitted.

In the example of FIG. 2, the copy instruction has not been transmitted at a time point at which the polling is started. When the transmission timing for the copy instruction arrives, the controller 20 uses the synchronous communication to transmit the copy instruction to the motor control apparatus 30 (Step S101). In Step S101, the controller 20 uses the CPU 21, an ASIC, or the like so as to execute a clocking operation, to thereby determine whether or not the transmission timing has arrived. In the example of FIG. 2, a case in which the transmission timing arrives in the "control cycle 1" is illustrated.

In this embodiment, it is assumed that the user can specify any timing as the timing to transmit the copy instruction. For example, the user may specify an occurrence of a specific event as the transmission timing. The "event" is an event that occurs in the communication system 1, and is, for example, an event occurring in manufacturing, generation of the alarm, generation of the alarm having a specific alarm code, turning-on of a specific switch of the controller 20 or the motor control apparatus 30, a state in which a torque waveform presents a specific characteristic, or a state in which a feedback speed enters a predetermined range. Moreover, for example, the user may specify a specific control cycle as the transmission timing, or may specify a specific timing in a control cycle as the transmission timing.

When the controller 20 has transmitted the copy instruction, the controller 20 changes the value of the copy completion status to "completed" (Step S102). The controller 20 may change the copy completion status to "completed" when the transmission timing is determined to have arrived, and may thus change the copy completion status to "completed" before the copy instruction is actually transmitted.

When the motor control apparatus 30 receives the copy instruction, the motor control apparatus 30 processes the copy instruction as a synchronous task, and copies the state data stored in the original data area to the data copy area (Step S103). In Step S103, the motor control apparatus 30 copies the first state data stored in the first original data area to a first data copy area, and copies the second state data stored in the second original data area to a second data copy area immediately after the reception of the copy instruction. As a result, even when the next "control cycle 2" arrives, the first state data 1-1 and the second state data 2-1 in the "control cycle 1" are held, and can later be read out without haste.

Meanwhile, the polling is periodically executed in the data collection apparatus 10 (Step S104), and when the data collection apparatus 10 detects that the copy completion status of the controller 20 is "completed", the data collection apparatus 10 transmits the data request to the controller 20 (Step S105). The data request is an instruction to request for the transmission of the state data. In other words, the data request is a request for reading out the data copy area. The data request may be executed through transmission of data having a predetermined format, and contains an identifier for identifying the data request.

For example, the data request contains information that enables identification of the state data to be read out, and contains, for example, a name of the state data to be read out or a memory address of the data copy area. When the state data in all of the data copy areas are forcedly read out, and it is thus not required to individually specify the state data to be read out, those pieces of information may not be contained in the data request. In the example of FIG. 2, the state data 1-1 in the first data copy area and the state data 2-1 in the second data copy area are sequentially read out, and the data request transmitted in Step S105 thus contains, for example, a memory address of the first data copy area.

When the controller 20 receives the data request, the controller 20 uses asynchronous communication so as to transfer the data request to the motor control apparatus 30 (Step S106). When the motor control apparatus 30 receives the data request, the motor control apparatus 30 processes the data request as an asynchronous task, to thereby transmit the state data 1-1 stored in the first data copy area to the controller 20 (Step S107). In Step S107, the motor control apparatus 30 does not always immediately transmit the state data even when the motor control apparatus 30 receives the data request, but the state data 1-1 stored in the first data copy area is held without being updated, and hence content of the state data 1-1 does not change even when the transmission of the state data 1-1 takes time.

When the controller 20 receives the state data 1-1, the controller 20 transfers the state data 1-1 to the data collection apparatus 10 (Step S108). When the controller 20 transfers the state data 1-1, the controller 20 may store the state data 1-1 in the own storage 22. The data collection apparatus 10 receives the state data 1-1, and records the state data 1-1 in the storage 32 (Step S109). Subsequently, as illustrated in Step S110 to Step S114, a data request for the state data 2-1 stored in the second data copy area is transmitted, and the state data 2-1 is transmitted as in Step S105 to Step S109.

It is assumed that the copy completion status returns to "not completed" at any timing. For example, when the controller 20 receives the data request, the copy completion status may return to "not completed", or when the controller 20 transfers the state data, the copy completion status may return to "not completed". Then, when a next transmission timing arrives, the state data is copied as in Step S101 to Step S103, and then, the copied state data is transmitted as in Step S104 to Step S114.

[4. Functions to be Implemented in Communication System]

Figure 4:
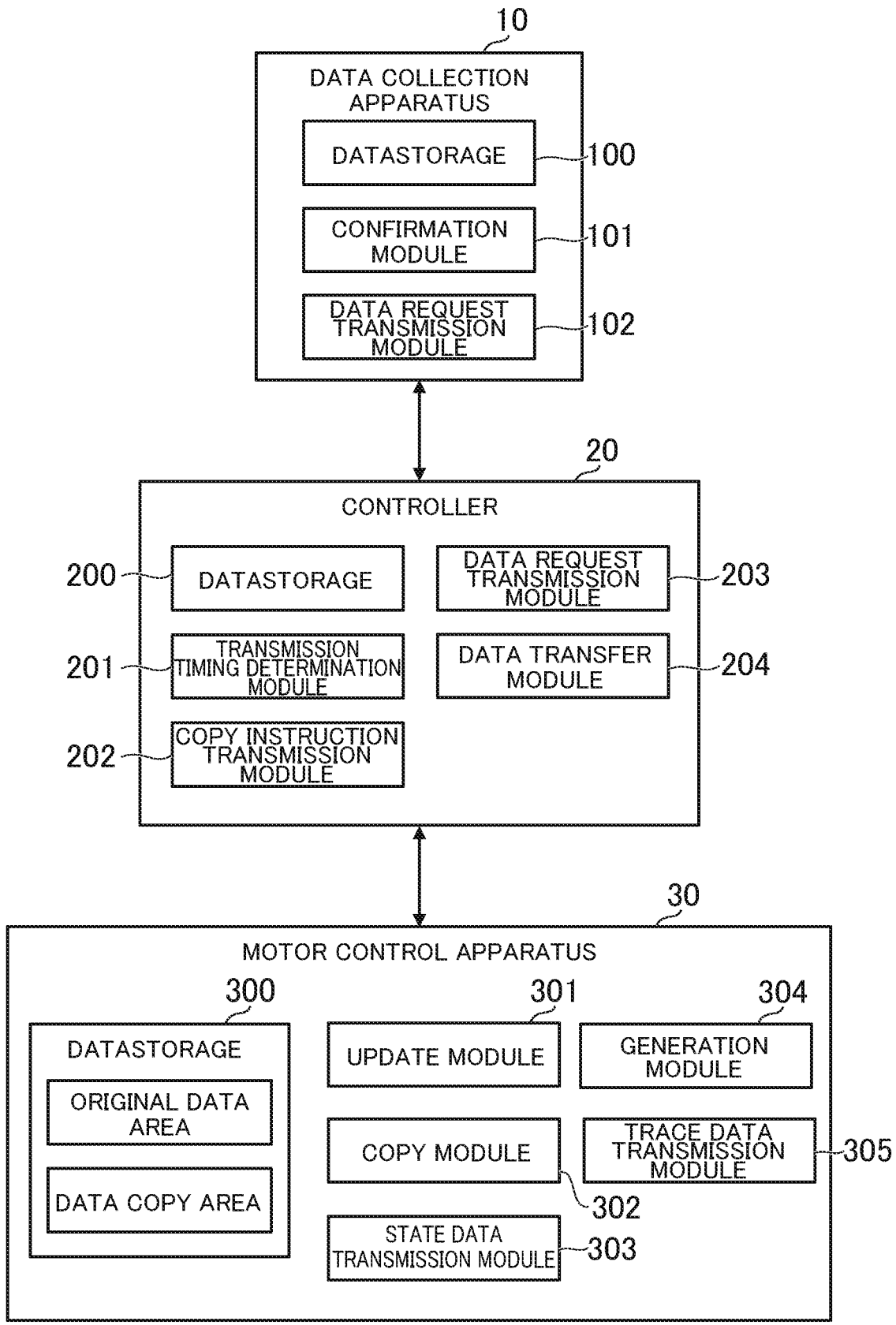
FIG. 4 is a functional block diagram for illustrating functions to be implemented in the communication system.

FIG. 4 is a functional block diagram for illustrating functions to be implemented in the communication system 1. The functions to be implemented by each of the data collection apparatus 10, the controller 20, and the motor control apparatus 30 are now described.

[4-1. Functions to be Implemented in Controller]

As illustrated in FIG. 4, in the controller 20, a data storage 200, a transmission timing determination module 201, a copy instruction transmission module 202, a data request transmission module 203, and a data transfer module 204 are implemented. The data storage 200 is implemented mainly by the storage 22. The transmission timing determination module 201, the copy instruction transmission module 202, the data request transmission module 203, and the data transfer module 204 are implemented mainly by the CPU 21.

[Data Storage]

The data storage 200 is configured to store data required for controlling the motor control apparatus 30. For example, the data storage 200 stores details of a command directed to the motor control apparatus 30. The details of a command may be defined in a program or a parameter, and the data storage 200 may store the program or the parameter. Moreover, for example, the data storage 200 stores time information indicating time inside the controller 20. The time information is sometimes referred to as "timer" or "counter". The controller 20 uses clocking processing so as to update the time information.

Moreover, for example, the data storage 200 stores data required for acquiring the state data. For example, the data storage 200 stores the timing to transmit the copy instruction. In this embodiment, the user specifies the timing to transmit the copy instruction, and the data storage module 200 stores the transmission timing specified by the user. For example, when the user specifies an alarm code, the alarm code is stored as the transmission timing. Moreover, for example, the data storage 200 stores the above-mentioned copy completion status. Moreover, for example, the data storage 200 stores the state data received from the motor control apparatus 30.

Moreover, for example, the data storage 200 stores data required for acquiring the trace data. For example, a change in the physical quantity detected by the sensor 50 or the encoder 60 in time series is indicated in the trace data. The trace data indicates a log (history) of an operation, and is thus sometimes referred to as "logging data". The trace data may be a change in time series in the state data. For example, the data storage 200 stores a measurement condition for the trace data. The measurement condition is a condition referred to when the trace data is acquired, and is, for example, a trigger condition for starting the acquisition of the trace data, an axis to be traced, a type of information (signal) to be traced, a sampling cycle, or a trace period. Moreover, for example, the data storage 200 stores the trace data received from the motor control apparatus 30.

The data stored in the data storage 200 is not limited to the above-mentioned example. For example, the data storage 200 may store machine information indicating a configuration of machines connected to the controller 20, and may store IP addresses of the data collection apparatus 10 and the motor control apparatus 30.

[Transmission Timing Determination Module]

The transmission timing determination module 201 is configured to determine whether or not the timing to transmit the copy instruction specified by the user has arrived. For example, when the user directly specifies a time of the transmission timing, the transmission timing determination module 201 determines whether or not the transmission timing has arrived based on the time information stored in the data storage 200. The transmission timing determination module 201 determines whether or not a numerical value, which is indicated by the time information updated as the time elapses, has indicated the transmission timing. The transmission timing determination module 201 determines that the transmission timing has arrived when the numerical value indicated by the time information has indicated the transmission timing.

Moreover, for example, when the user specifies an event as the transmission timing, the transmission timing determination module 201 determines whether or not the event specified by the user has occurred, to thereby determine whether or not the transmission timing has arrived. For example, the transmission timing determination module 201 may determine that the transmission timing has arrived when an alarm has been generated, or determines that the transmission timing has arrived when an alarm having an alarm code specified by the user has been generated. Examples of other events are as described above. The transmission timing determination module 201 may execute determination processing corresponding to the event specified by the user.

[Copy Instruction Transmission Module]

The copy instruction transmission module 202 of the controller 20 is configured to transmit the copy instruction to the motor control apparatus 30. In this embodiment, the communication system 1 can use the synchronous communication, and hence the copy instruction transmission module 202 uses the synchronous communication so as to transmit the copy instruction to the motor control apparatus 30. The copy instruction transmission module 202 causes the motor control apparatus 30 to execute the copy instruction as a synchronous task. When the communication system 1 does not use the synchronous communication, the copy instruction transmission module 202 transmits the copy instruction without particularly using synchronous communication.

In this embodiment, the user specifies the timing to transmit the copy instruction in advance, and hence the copy instruction transmission module 202 transmits the copy instruction to the motor control apparatus 30 when the transmission timing is determined to have arrived. In other words, the copy instruction transmission module 202 transmits the copy instruction in response to the determination that the transmission timing has arrived (with a trigger of, or on condition of, the arrival of the transmission timing). When the transmission timing is determined not to have arrived, the copy instruction transmission module 202 does not transmit the copy instruction to the motor control apparatus 30, and postpones the transmission of the copy instruction until the transmission timing is determined to have arrived.

In a case in which the timing to transmit the copy instruction is not determined in advance, for example, the copy instruction transmission module 202 may transmit the copy instruction when a predetermined instruction is received from a computer, for example, the data collection apparatus 10, or may transmit the copy instruction when the user executes a predetermined operation.

[Data Request Transmission Module]

The data request transmission module 203 is configured to transmit the data request to the motor control apparatus 30. In this embodiment, the data request transmission module 203 uses the asynchronous communication so as to transmit the data request to the motor control apparatus 30. The data request transmission module 203 causes the motor control apparatus 30 to execute the data request as an asynchronous task. When the communication system 1 does not use synchronous communication, the data request transmission module 203 transmits the copy instruction independently of whether communication to be used is synchronous communication or asynchronous communication.

In this embodiment, the data collection apparatus 10 transmits the data request to the controller 20, and hence the data request transmission module 203 transfers the data request received from the data collection apparatus 10 to the motor control apparatus 30. That is, the controller 20 is interposed between the data collection apparatus 10 and the motor control apparatus 30, and hence the data request transmission module 203 relays the data request from the data collection apparatus 10 to the motor control apparatus 30.

The data collection apparatus 10 may not transmit the data request, but the data request may be transmitted in accordance with determination by the controller 20. That is, the controller 20 may not transfer the data request from the data collection apparatus 10, but may voluntarily transmit the data request. For example, the data request transmission module 203 may transmit the data request when a predetermined time period has elapsed after the copy instruction was transmitted. Moreover, for example, the user may specify a timing of the data request, and the data request transmission module 203 may transmit the data request when the timing specified by the user has arrived. In addition, for example, the data request transmission module 203 may acquire a traffic volume of communication, and may transmit the data request when the traffic volume is less than a threshold value (when a communication load is low).

[Data Transfer Module]

The data transfer module 204 is configured to transfer the state data received from the motor control apparatus 30 to the data collection apparatus 10. That is, the data transfer module 204 relays the state data from the motor control apparatus 30 to the data collection apparatus 10. The data transfer module 204 may record the state data received from the motor control apparatus 30 in the data storage 200 while transferring the state data to the data collection apparatus 10. When the data collection apparatus 10 does not transmit the data request, but the data request is transmitted in accordance with determination by the controller 20, the data transfer module 204 may be omitted so that the state data may not be transferred, or the state data may be transferred also in this case.

[4-2. Functions to be Implemented in Motor Control Apparatus]

As illustrated in FIG. 4, in the motor control apparatus 30, a data storage 300, an update module 301, a copy module 302, a state data transmission module 303, a generation module 304, and a trace data transmission module 305 are implemented. The data storage 300 is implemented mainly by the storage 32. The update module 301, the copy module 302, the state data transmission module 303, the generation module 304, and the trace data transmission module 305 are implemented mainly by the CPU 31.

[Data Storage]

The data storage 300 includes the original data areas and the data copy areas. In this embodiment, a plurality of such areas exist, and hence the data storage 300 is divided into a plurality of storage areas, and each of the plurality original data areas and each of the plurality of data copy areas are associated with each other. The correspondence between the original data area and the data copy area is stored in advance in the data storage 300, and it is defined in advance that which original data area is the copy source, and which data copy area is the copy destination. For example, a correspondence between memory addresses thereof is defined in advance. Moreover, for example, a correspondence between the type of the state data and a data area to be used to store is also stored in advance in the data storage 300.

For example, the data storage 300 stores data required for controlling the motor 40. For example, the data storage 300 stores firmware and various types of parameters required for controlling the motor 40. Moreover, for example, the data storage 300 stores time information indicating time in the motor control apparatus 30. The motor control apparatus 30 updates the time information through clocking processing.

Moreover, for example, the data storage 300 stores data required for acquiring the state data. When the state data is data that requires calculation, the data storage 300 stores an equation for the calculation. Moreover, for example, the data storage 300 stores data required for acquiring the trace data. For example, the data storage 200 stores a measurement condition for the trace data. The data stored in the data storage 200 is not limited to the above-mentioned example. For example, the data storage 300 may store an IP address of the controller 20, or information such as the control cycle and a transmission cycle.

[Update Module]

The update module 301 is configured to update the state data in the original data area based on the own operation. The update of the state data is to overwrite the content of the state data to the latest state. For example, the update module 301 updates the state data based on an internal state of the motor control apparatus 30 or the detection signal of the sensor 50 or the encoder 60. In this embodiment, a description is given of a case in which the update module 301 periodically updates the state data, but the update module 301 may non-periodically update the state data. When the state data is non-periodically updated, the update may be executed when a certain condition serving as a trigger is satisfied.

In this embodiment, the control cycle of the motor control apparatus 30 is defined, and hence the update module 301 updates the state data in the original data area each time the control cycle arrives. For example, when the motor 40 is operated based on the operation command received from the controller 20, the update module 301 acquires the latest value of the state data based on the internal state of the motor control apparatus 30, or the detection signal of the sensor 50 or the encoder 60, to thereby update the state data in the original data area.

In this embodiment, the sensor 50 is connected to the motor control apparatus 30, and hence the update module 301 stores the detection result obtained by the sensor 50 in the original data area. The update module 301 may directly store a waveform of the detection signal of the sensor 50 in the original data area as the state data, or store a value calculated based on the detection signal of the sensor 50 in the original data area as the state data.

For example, when the state data is the settling time, the update module 301 measures a time period until the COIN signal rises after the speed indicating the position command speed enters a predetermined range (for example, 0), and stores the time period in the original data area. Moreover, for example, when the state data is the overshoot amount, the update module 301 calculates a total amount corresponding to a component by which the motor 40 exceeds a stop position based on a position deviation, and stores the total amount in the original data area. Moreover, for example, when the state data is the residual vibration frequency, the update module 301 calculates the frequency of a waveform indicated by the position deviation, and stores the frequency in the original data area. Moreover, for example, when the state data is the COIN width, the update module 301 calculates the length of the COIN width based on a position deviation when the COIN signal rises, and stores the length in the original data area.

In this embodiment, the plurality of original data areas are set in the data storage, and hence the update module 301 updates the state data in each of the plurality of original data areas. The update method for individual pieces of the state data is as described above. The update module 301 acquires each of the plurality of pieces of state data, and stores the plurality of pieces of state data in corresponding original data areas.

[Copy Module]

The copy module 302 is configured to copy the state data in the original data area to the data copy area when the copy instruction is received. In other words, the copy module 302 copies the state data in the original data area in response to the reception of the copy instruction (with a trigger of, or on condition of, the reception of the copy instruction). When the copy module 302 has not received the copy instruction, the copy module 302 does not copy the state data in the original data area, and postpones the copy of the state data in the original data area until the copy instruction is received.

For example, when the memory address of an original data area to be copied is contained in the copy instruction, the copy module 302 identifies the original data area to be copied based on the memory address contained in the copy instruction. Moreover, for example, when the type of the state data to be copied is contained in the copy instruction, the copy module 302 identifies the state data to be copied based on the type contained in the copy instruction.

In this embodiment, the detection result obtained by the sensor 50 is stored in the state data, and the copy module 302 copies the detection result obtained by the sensor 50 to the data copy area. Moreover, in this embodiment, the copy module 302 copies the state data in each of the plurality of original data areas to the state data copy areas associated with the original data areas. The copy module 302 may copy pieces of state data in the respective plurality of original data areas at once, or may individually copy pieces of state data in the respective original data areas each time the copy instruction is received.

[State Data Transmission Module]

The state data transmission module 303 is configured to transmit the state data in the data copy area to the controller 20. In this embodiment, the state data transmission module 303 transmits the data in the data copy area when the data request is received. In other words, the state data transmission module 303 transmits the state data in the original data area in response to the reception of the data request (with a trigger of, or on condition of, the reception of the data request). When the state data transmission module 303 has not received the readout request, the copy module 302 does not transmit the state data in the original data area, and postpones the transmitting of the state data in the original data area until the readout request is received.

The motor control apparatus 30 may voluntarily transmit the state data. In this case, the state data transmission module 303 may transmit the state data at any timing. For example, the state data transmission module 303 may transmit the state data when a certain time period has elapsed after the state data was copied to the data copy area. Moreover, for example, the state data transmission module 303 may transmit the state data when a predetermined timing within the control cycle arrives. Moreover, for example, the state data transmission module 303 may transmit the state data when the communication traffic volume becomes less than a threshold value, or may transmit the state data when the CPU usage rate becomes less than a threshold value.

For example, when the memory address of a data copy area to be transmitted is contained in the data request, the state data transmission module 303 identifies the data copy area to be transmitted based on the memory address contained in the data request. Moreover, for example, when the type of the state data to be transmitted is contained in the data request, the state data transmission module 303 identifies the state data to be transmitted based on the type contained in the data request.

In this embodiment, the detection result obtained by the sensor 50 is stored in the data copy area, and hence the state data transmission module 303 transmits the detection result obtained by the sensor 50 stored in the data copy area. In this embodiment, the motor control apparatus 30 can transmit not only the state data but also the trace data, and hence the state data transmission module 303 transmits the data in the data copy area independently of the trace data transmission module 305.

In this embodiment, the plurality of data copy areas are set to the data storage 200, and hence the state data transmission module 303 transmits the state data in each of the plurality of data copy areas to the controller 20. For example, the state data transmission module 303 may transmit pieces of state data in the respective plurality of data copy areas at once, or may individually transmit pieces of state data in the respective data copy areas each time the data request is received.

[Generation Module]

The generation module 304 is configured to generate the trace data indicating the own operation state. For example, the generation module 304 generates the trace data based on the internal state of the motor control apparatus 30 or the physical quantity detected by the sensor 50 or the encoder 60.

In this embodiment, the generation module 304 generates the trace data when the trace data generation instruction is received from the controller 20. The trace data generation instruction is an instruction for staring the generation (acquisition) of the trace data. The trace data generation instruction may be executed through transmission of data having a predetermined format, and contains an identifier for identifying the trace data generation instruction. The trace data generation instruction can acquire the trace data at a desired timing of the controller 20, and is sometimes referred to as "network trigger".

The generation module 304 starts the generation of the trace data in response to the reception of the trace data generation instruction. In other words, the generation module 304 does not start the generation of the trace data until the trace data generation instruction is received, and starts the generation of the trace data when the trace data generation instruction is received. In this embodiment, the controller 20 uses asynchronous communication so as to transmit the trace data generation instruction. The generation module 304 starts the generation of the trace data as an asynchronous task when the trace data generation instruction is received.

For example, the generation module 304 generates the trace data based on the measurement condition for the trace data. For example, when an axis to be traced is indicated in the measurement condition, the generation module 304 generates the trace data based on a state of the axis to be traced. Moreover, for example, when a type of information (signal) to be traced is indicated in the measurement condition, the generation module 304 generates the trace data based on the type of information. Moreover, for example, when the sampling cycle is indicated in the measurement condition, the generation module 304 generates the trace data based on the sampling cycle. Moreover, for example, when the trace period is indicated in the measurement condition, the generation module 304 generates the trace data based on this trace period.

[Trace Data Transmission Module]

The trace data transmission module 305 is configured to transmit the trace data. For example, the trace data transmission module 305 transmits the trace data in the data storage 300 when the trace data request is received. The trace data request is an instruction for requesting the transmission of the trace data. In other words, the trace data request is a request to read out the storage area in which the trace data is stored. The trace data request may be executed through transmission of data having a predetermined format, and contains an identifier for identifying the trace data request.

In this embodiment, the controller 20 uses asynchronous communication so as to transmit the trace data request. The trace data transmission module 305 processes the trace data request as an asynchronous task, and transmits the trace data in the data storage 300 when the trace data request is received. The motor control apparatus 30 may voluntarily transmit the trace data. In this case, the trace data transmission module 305 may transmit the trace data at any timing.

[4-3. Functions to be Implemented in Data Collection Apparatus]

As illustrated in FIG. 4, in the data collection apparatus 10, a data storage 100, a confirmation module 101, and a data request transmission module 102 are implemented. The data storage 100 is implemented mainly by the storage 12. The confirmation module 101 and the data request transmission module 102 are implemented mainly by the CPU 11.

[Data Storage]

The data storage 100 is configured to store the state data and the trace data received from the controller 20 by the data collection apparatus 10. The state data and the trace data are displayed on the display 15 or input to an application for analysis. In addition, for example, the data storage 100 may store the machine information indicating the configurations of the motor control apparatus 30 and sensors connected to the controller 20, and the IP address of the controllers 20. Moreover, for example, the data storage 100 may store the acquisition conditions for the trace data. In this case, the acquisition conditions may be loaded from the data collection apparatus 10 onto the controller 20. Moreover, for example, the data storage 100 may store commands directed from the controller 20 to the motor control apparatus 30 in time series.

[Confirmation Module]

The confirmation module 101 is configured to confirm whether or not the copy instruction has transmitted by the copy instruction transmission module 202. In this embodiment, the copy instruction transmission module 202 is implemented by the controller 20, and hence the confirmation module 101 inquires of the controller 20 whether or not the copy instruction has been transmitted. The confirmation module 101 receives a reply from the controller 20, to thereby confirm whether or not the copy instruction has been transmitted. The confirmation by the confirmation module 101 may periodically be executed, or may non-periodically be executed. For example, the confirmation module 101 requests a copy completion status from the controller 20, and inquires whether or not the copy instruction has been transmitted based on the copy completion status received from the controller 20.

[Data Request Transmission Module]

The data request transmission module 102 is configured to transmit the data request to the controller 20. The data request transmission module 102 transmits the data request to the controller 20 when the transmission of the copy instruction is confirmed. The data request transmission module 102 transmits the data request in response to the confirmation of the transmission of the copy instruction (with a trigger of, or on condition of, the transmission of the copy instruction). The data request transmission module 102 does not transmit the data request when the transmission of the copy instruction is not confirmed, and postpones the transmission of the data request until the transmission of the copy instruction is confirmed.

According to the above-mentioned communication system 1, when the motor control apparatus 30 receives the copy instruction from the controller 20, the motor control apparatus 30 copies the data in the original data area to the data copy area, and then transmits the data in the data copy area. The motor control apparatus 30 is not required to immediately transmit the data acquired at a desired timing, and may transmit the data at any timing, and hence the communication load (communication cost) can be reduced. For example, when the motor control apparatus 30 immediately transmits the data after the copy instruction is received, the controller 20 can acquire the data updated at a desired timing in any case. However, when other more important data is required to be transmitted at this time, the communication load increases, and a problem may occur in the transmission of the other more important data. In this respect, according to the communication system 1, the data held in the data copy area may be transmitted at any timing, and hence the data is not required to immediately be transmitted after the copy instruction is received, and the communication load can thus be reduced.

Moreover, for example, even when the data in the original data area is updated in a period after the motor control apparatus 30 received the copy instruction until the motor control apparatus 30 transmits the data to the controller 20, the data at the desired timing is held in the motor control apparatus 30, and hence the controller 20 can acquire the data updated at the desired timing. Moreover, for example, when the motor control apparatus 30 receives the copy instruction, the motor control apparatus 30 is not required to transmit the data in the original data area, and may copy the data to the data copy area, and transmit the data in the data copy area at any later timing. Therefore, the processing at the time of the reception of the copy instruction can be simplified, thereby reducing a processing load imposed on the motor control apparatus 30. Moreover, for example, in a case in which trace data storing data in a certain period in time series is to be transmitted, when the desired timing is contained in this period, the data acquired at the desired timing can be transmitted in any case. However, but the trace data contains unnecessary data other than the data at the desired timing, and hence the data quantity may increase. In this respect, the data can be acquired at an exactly desired timing, and the data quantity can thus be reduced.

Moreover, when the motor control apparatus 30 receives the data request from the controller 20, through the transmission of the data in the data copy area, it is possible to select a timing at which the communication load is relatively low (for example, the user specifies a timing to transmit the data request so that the data is transmitted at such a timing) to transmit the data after the data is copied to the data copy area, and the communication load can thus effectively be reduced.

Moreover, when synchronous communication is used to transmit the data request, the motor control apparatus 30 is required to immediately transmit the data. However, when asynchronous communication is used to transmit the data request, the motor control apparatus 30 is not required to immediately transmit the data, and the communication load can thus be reduced. For example, the controller 20 can transmit the data in the data copy area at a timing at which other relatively important data has been transmitted, or at a timing at which the own processing load is low. Thus, the communication load can be reduced, and the processing load imposed on the controller 20 can be reduced.

Moreover, the controller 20 transfers the data request received from the data collection apparatus 10 to the motor control apparatus 30, and then transfers the data received from the motor control apparatus 30 to the data collection apparatus 10, to thereby cause the data collection apparatus 10 to acquire the data updated at a desired timing. For example, when the data collection apparatus 10 collects data from a large number of motor control apparatus 30, an amount of memory consumed by the data collection apparatus 10 tends to increase, but the data at an exactly desired timing can be acquired, thereby being able to effectively reduce the consumed quantity of the memory.

Moreover, if the data request is transmitted before the transmission of the copy instruction, the data request is transmitted before the data is copied to the data copy area, and the data collection apparatus 10 cannot acquire the data updated at the desired timing. However, the data collection apparatus 10 transmits the data request to the controller 20 when the data collection apparatus 10 confirms the transmission of the copy instruction, and the data collection apparatus 10 can thus more reliably acquire the data updated at the desired timing.

Moreover, the controller 20 uses the synchronous communication to transmit the copy instruction to the motor control apparatus 30, and the motor control apparatus 30 thus immediately execute the transmitted copy instruction. Thus, the controller 20 can more reliably acquire the data updated at the desired timing.

Moreover, when the sensor 50 is connected to the motor control apparatus 30, the motor control apparatus 30 stores the detection result acquired from the sensor 50 in the original data area, to thereby be able to cause the controller 20 to acquire the detection result acquired at the desired timing.

Moreover, the data in the data copy area is transmitted independently of the trace data, and thus a mode of transmitting the trace data and a mode of transmitting the data by a method other than that for the trace data can selectively be used. As a result, the convenience of the user can be increased when the controller 20 acquires the data from the motor control apparatus 30. For example, when data in time series is required, the mode of transmitting the trace data is used. When data in time series is not required, but data at an exactly desired timing is required, the mode described in this embodiment can be used. As a result, the convenience of the user can be increased.

Moreover, the user specifies the timing to transmit the copy instruction, and thus the controller 20 can acquire data updated at a timing desired by the user.

Moreover, each of the plurality of original data areas and each of the plurality of data copy areas are associated with each other, and the motor control apparatus 30 transmits data in each of the plurality of data copy areas, to thereby be able to cause the controller 20 to acquire a plurality of pieces of data updated at the desired timing. As a result, the communication load and the processing load imposed on the motor control apparatus 30 can effectively be reduced.

Moreover, when the motor control apparatus 30 serving as the slave machine receives the copy instruction from the controller 20 serving as the master machine, the data in the original data area is copied to the data copy area. Thus, even when the data in the original data area is subsequently updated, the data at the timing at which the copy instruction was transmitted is held in the data copy area, and hence the master machine can acquire the data updated at the desired timing.

[5. Modification Examples]

The present invention is not limited to the embodiment described above, and can be modified suitably without departing from the spirit of the present invention.

(1) For example, in the embodiment, a description has been given of the case in which the state data whose content is fixed is stored in the original data area, but the original data area may have a fixed state, in which the content of data is fixed, and an unfixed state, in which the content of data is not fixed. The "fixed state" is a state in which the calculation of the state data is finished. The "unfixed state" is a state in which the calculation of the state data is not finished, and is, for example, a state in which values of being calculated and other information are temporarily stored. When the copy is executed in the unfixed state, accurate state data cannot be acquired, and hence the copy may be executed when the original data area is brought into the fixed state.

For example, it is often the case that, in the so-called positioning system data illustrated in FIG. 2, the data has been calculated and the content of data is fixed by a time point immediately before a next control cycle. Therefore, the copy instruction transmission module 202 may transmit the copy instruction a predetermined time before the control cycle arrives (for example, immediately before the arrival of the control cycle). For example, the copy instruction transmission module 202 may transmit the copy instruction when a certain period has elapsed after the position command speed presents a stop of the motor 40. Further, the controller 20 or the motor control apparatus 30 may determine whether or not the content of data is brought into the fixed state.

Figure 5:
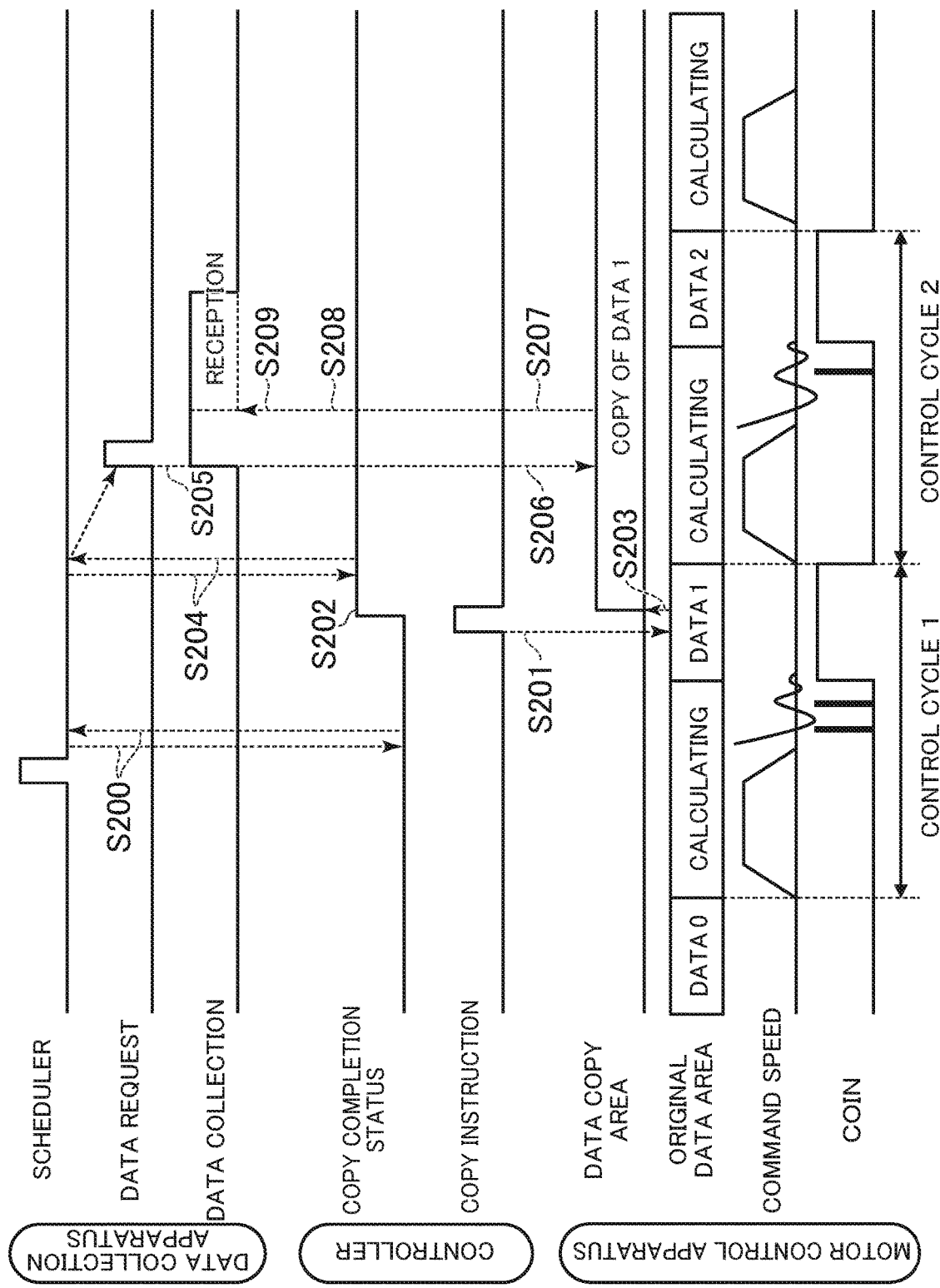
FIG. 5 is a diagram for illustrating processing to be executed in the communication system according to a modification example of the present invention.

FIG. 5 is a diagram for illustrating processing to be executed in the communication system 1 according to a modification example of the present invention. In FIG. 5, one original data area and one data copy area are illustrated for the sake of a simple description. In this modification example, a description is given of the settling time as an example of the state data. As illustrated in FIG. 5, a rough flow is the same as that of the processing described in the embodiment, but the settling time is not fixed until the COIN signal rises. A period until the COIN signal rises out of the control cycle is "calculating" and is thus in the unfixed state, and is brought into the fixed state after the COIN signal rises.

Processing in Step S200 is the same as the processing in Step S100 of FIG. 2, and the polling is executed between the data collection apparatus 10 and the controller 20. Processing in Step S201 is also the same as the processing in Step S101, but in this modification example, the timing to transmit the copy instruction is defined so as to be after the COIN signal rises. The transmission timing is specified in accordance with experiential rules of the user, or the motor control apparatus 30 may transmit such a notification that the COIN signal has risen, and the controller 20 may transmit the copy instruction when this notification is received. Processing in subsequent Step S202 to Step S208 is the same as the processing in Step S102 to Step S108, respectively. Specifically, the state data in the fixed state is copied from the original data area to the data copy area, and the state data in the data copy area is transmitted to the data collection apparatus through the controller 20.

Figure 6:
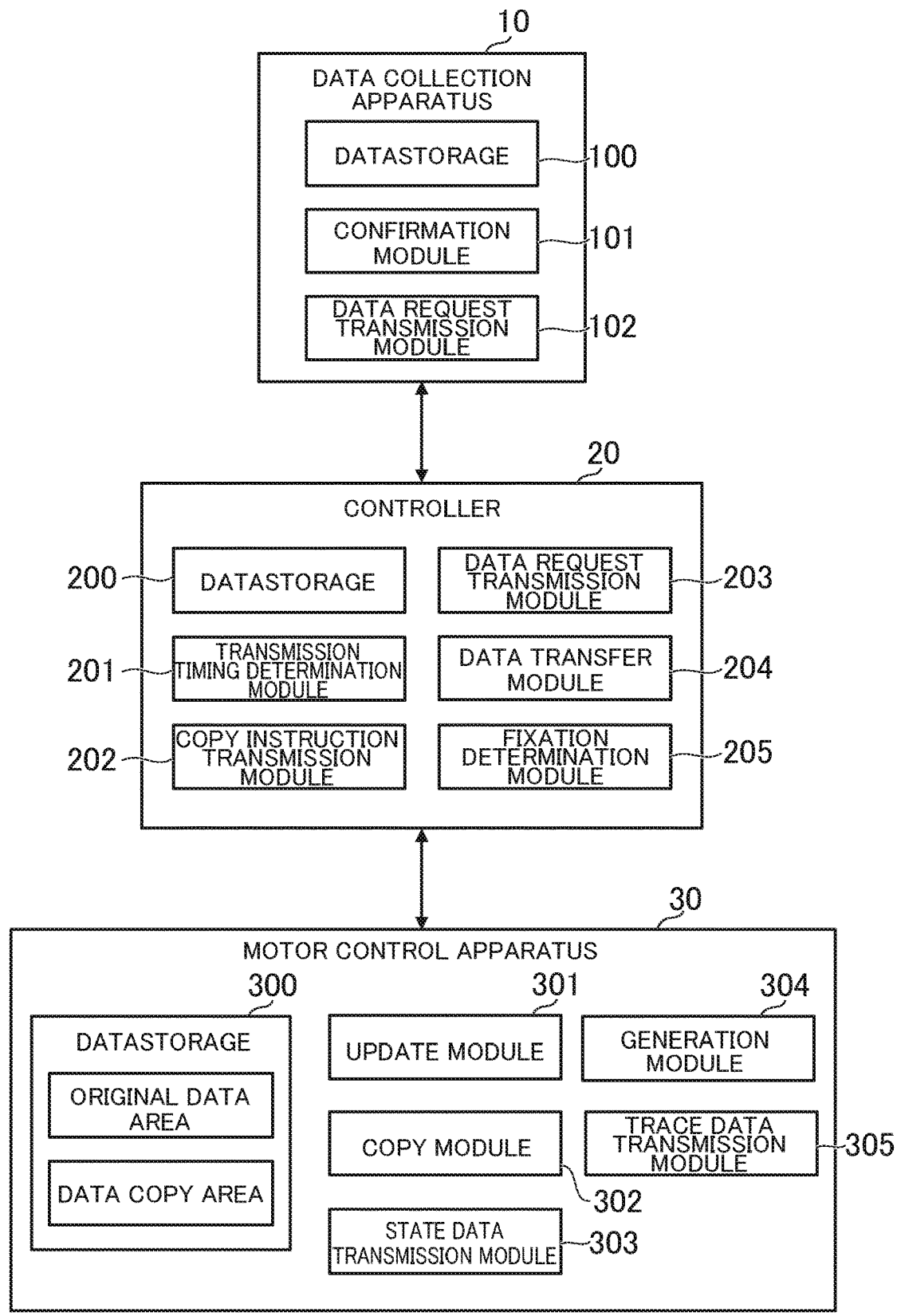
FIG. 6 is a functional block diagram in the modification example.

FIG. 6 is a functional block diagram for illustrating the modification example. As illustrated in FIG. 6, the communication system 1 according to the modification example includes a fixation determination module 205 configured to determine whether or not the original data area is in the fixed state. In the modification example, a description is given of a case in which the fixation determination module 205 is implemented mainly by the CPU 21 of the controller 20, but the fixation determination module 205 may be implemented mainly by the CPU 31 of the motor control apparatus 30. For example, when the user specifies the timing at which the original data area is brought into the fixed state, the fixation determination module 205 determines whether or not this timing has arrived.

When the fixation determination module 205 is implemented by the motor control apparatus 30, the fixation determination module 205 determines whether or not the original data area is in the fixed state based on the internal state of the motor control apparatus 30, or the detection signal of the sensor 50 or the encoder 60. For example, when the settling time is the state data, the fixation determination module 205 determines whether or not the COIN signal has risen. Moreover, for example, when the overshoot amount is the state data, the fixation determination module 205 determines whether or not the overshoot has settled based on the position deviation. Moreover, for example, the residual vibration frequency is the state data, the fixation determination module 205 determines whether or not a certain time period has elapsed after the COIN signal rose. Moreover, for example, when the COIN width is the state data, the fixation determination module 205 determines whether or not the COIN signal has risen.

The copy module 302 copies the data in the original data area to the data copy area when the original data area is determined to be in the fixed state. In other words, the copy module 302 copies the state data in the original data area in response to the determination that the original data area is in the fixed state (with a trigger of, or on condition of, the determination that the original data area is in the fixed state). The copy module 302 does not copy the state data in the original data area when the original data area is not determined to be in the fixed state, and postpones the copy of the state data in the original data area until the original data area is determined to be in the fixed state.

According to Modification Example (1) of the present invention, when the original data area is determined to be in the fixed state, the data in the original data area is copied to the data copy area, thereby being able to prevent inaccurate data whose content is not fixed from being transmitted. For example, when the determination module is implemented by the controller 20, the copy instruction may be transmitted after the original data area is determined to be in the fixed state, and the fixed data can reliably be copied and transmitted. Moreover, for example, when the fixation determination module 205 is implemented by the motor control apparatus 30, the execution of the copy processing may be postponed until the original data area is determined to be in the fixed state after the copy instruction is received, and the fixed data can reliably be copied and transmitted.

(2) For example, the copy module 302 may copy the state data in the original data area to a plurality of data copy areas in time series. That is, the original data area and the data copy areas may have a one-to-many relationship. For example, when certain state data for three control cycles is to be copied, three data copy areas are required. When the copy module 302 receives a first copy instruction, the copy module 302 copies the state data in the original data area at this time point to a first data copy area. When the copy module 302 receives a second copy instruction, the copy module 302 copies the state data in the original data area at this time point to a second data copy area. When the copy module 302 receives a third copy instruction, the copy module 302 copies the state data in the original data area at this time point to a third data copy area.

The transmission module transmits to the controller 20 the state data copied in time series in the plurality of data copy areas. For example, the transmission module may transmit the state data in the plurality of data copy areas at once, or may transmit the state data each time the data request is received.

According to Modification Example (2) of the present invention, a plurality of data copy areas are prepared in the motor control apparatus 30, and the data in the original data area is copied to the plurality of data copy areas and transmitted in time series, thereby be able to cause the controller 20 to acquire the time-series data updated at a desired timing.

(3) Moreover, for example, in the embodiment, a description has been given of the case in which the controller 20 corresponds to the first industrial machine, and the motor control apparatus 30 corresponds to the second industrial machine, but the data collection apparatus 10 may correspond to the first industrial machine, and the controller 20 or the motor control apparatus 30 may correspond to the second industrial machine. Moreover, for example, when a plurality of controllers 20 are included in the communication system 1, the first controller 20 may correspond to the first industrial machine, and the second controller may correspond to the second industrial machine. In addition, for example, a terminal in which an engineering tool for setting the controller 20 and the motor control apparatus 30 is installed may correspond to the first industrial machine, and the controller 20 or the motor control apparatus 30 may correspond to the second industrial machine. Moreover, for example, the third industrial machine may be a terminal in which an engineering tool is installed, or a cloud server.

Further, the embodiment described above is given as a specific example, and is not to limit the invention disclosed herein to the very configuration and data storage examples of the specific example. A person skilled in the art may make various modifications to the disclosed embodiment with regard to, for example, the shapes and numbers of physical components, data structures, and execution orders of processing. It is to be understood that the technical scope of the invention disclosed herein encompasses such modifications.

The invention claimed is:

1. A communication system comprising a first industrial machine and a second industrial machine, which are configured to communicate with each other,
   wherein the first industrial machine is configured to transmit a copy instruction to the second industrial machine, and
   wherein the second industrial machine is configured to:
     update data in a first storage area based on an operation of the second industrial machine;
     copy the data in the first storage area to a second storage area when the copy instruction is received; and
     transmit the data in the second storage area to the first industrial machine.

2. The communication system according to claim 1,
   wherein the first industrial machine is configured to transmit a data request to the second industrial machine, and
   wherein the second industrial machine is configured to transmit the data in the second storage area when the data request is received.

3. The communication system according to claim 2, wherein the first industrial machine is configured to use asynchronous communication so as to transmit the data request to the second industrial machine.

4. The communication system according to claim 2, further comprising a third industrial machine configured to collect the data,
   wherein the third industrial machine is configured to transmit the data request to the first industrial machine,
   wherein the first industrial machine is configured to transfer the data request received from the third industrial machine to the second industrial machine, and
   wherein the first industrial machine is configured to transfer the data received from the second industrial machine to the third industrial machine.

5. The communication system according to claim 4,
   wherein the third industrial machine is configured to confirm whether the copy instruction has been transmitted by the copy instruction transmission module, and
   transmit the data request to the first industrial machine when it is confirmed that the copy instruction has been transmitted.

6. The communication system according to claim 1, wherein the first industrial machine is configured to use synchronous communication to transmit the copy instruction to the second industrial machine.

7. The communication system according to claim 1,
   wherein the second industrial machine has a sensor connected thereto,
   wherein the second industrial machine is configured to store a detection result obtained by the sensor in the first storage area,
   copy the detection result to the second storage area, and transmit the detection result stored in the second storage area.

8. The communication system according to claim 1,
   wherein the second industrial machine is configured to: generate trace data indicating its operation state;
     transmit the trace data to the first industrial machine, and
     transmit the data in the second storage area independently of the trace data.

9. The communication system according to claim 1,
   wherein the first industrial machine is configured to determine whether a transmission timing to transmit the copy instruction, which is specified by a user, has arrived, and
   transmit the copy instruction to the second industrial machine when the transmission timing is determined to have arrived.

10. The communication system according to claim 1,
    wherein each of the plurality of first storage areas and each of the plurality of second storage areas are associated with each other in the second industrial machine,
    wherein the second industrial machine is configured to update a piece of data in each of the plurality of first storage areas,
    copy the piece of data in each of the plurality of first storage areas to a corresponding one of the plurality of second storage areas that is associated with the each of the plurality of first storage areas, and
    transmit the piece of data in each of the plurality of second storage areas to the first industrial machine.

11. The communication system according to claim 1,
    wherein the first storage area has a fixed state, in which a content of data is fixed, and an unfixed state, in which the content of the data is not fixed,
    wherein the communication system is configured to determine whether the first storage area is in the fixed state, and
    wherein the second industrial machine is configured to copy the data stored in the first storage area to the second storage area when the first storage area is determined to be in the fixed state.

12. The communication system according to claim 1,
    wherein the second industrial machine is configured to copy the data stored in the first storage area to the plurality of second storage areas in time series, and
    transmit to the first industrial machine the data copied to the plurality of second storage areas in time series.

13. The communication system according to claim 1,
    wherein the first industrial machine is a master machine,
    wherein the second industrial machine is a slave machine to be controlled by the master machine,
    wherein the master machine is configured to transmit the copy instruction to the slave machine, and
    transmit the data stored in the second storage area to the master machine.

14. A communication method, comprising:
    transmitting a copy instruction to a second industrial machine configured to communicate with a first industrial machine;
    updating data in a first storage area based on an operation of the second industrial machine;
    copying the data in the first storage area to a second storage area when the copy instruction is received; and
    transmitting the data in the second storage area to the first industrial machine.

15. A non-transitory computer readable information storage medium storing a program for causing a second industrial machine, which is configured to communicate with a first industrial machine, to:
    update data in a first storage area based on an operation of the second industrial machine;
    copy the data in the first storage area to a second storage area when a copy instruction is received from the first industrial machine; and
    transmit the data in the second storage area to the first industrial machine.

16. The communication system according to claim 3, further comprising a third industrial machine configured to collect the data,
- wherein the third industrial machine is configured to transmit the data request to the first industrial machine,
- wherein the first industrial machine is configured to transfer the data request received from the third industrial machine to the second industrial machine, and
- wherein the first industrial machine is configured to transfer the data received from the second industrial machine to the third industrial machine.

17. The communication system according to claim 2, wherein the first industrial machine is configured to use synchronous communication to transmit the copy instruction to the second industrial machine.

18. The communication system according to claim 4, wherein the first industrial machine is configured to use synchronous communication to transmit the copy instruction to the second industrial machine.

19. The communication system according to claim 5, wherein the first industrial machine is configured to use synchronous communication to transmit the copy instruction to the second industrial machine.

20. The communication system according to claim 2,
- wherein the second industrial machine has a sensor connected thereto,
- wherein the second industrial machine is configured to store a detection result obtained by the sensor in the first storage area,
- copy the detection result to the second storage area, and
- transmit the detection result stored in the second storage area.

\* \* \* \* \*